United States Patent [19]

Kolhoff

[11] Patent Number: 4,647,939
[45] Date of Patent: Mar. 3, 1987

[54] STABILIZED PLATFORM FOR SCANNING ANTENNA

[75] Inventor: Hendrik Kolhoff, Haaksbergen, Netherlands

[73] Assignee: Hollandse Signaalapparaten B.V., Hengelo, Netherlands

[21] Appl. No.: 683,093

[22] Filed: Dec. 18, 1984

[30] Foreign Application Priority Data

Jan. 3, 1984 [NL] Netherlands .......................... 8400008

[51] Int. Cl.⁴ ........................... H01Q 1/18; H01Q 1/34
[52] U.S. Cl. ..................................... 343/765; 343/766
[58] Field of Search ....................... 343/709, 765, 766; 248/177, 179, 184

[56] References Cited

U.S. PATENT DOCUMENTS

| 2,477,574 | 8/1949 | Braddon | 343/765 |
| 3,968,496 | 7/1976 | Brunvoll | 343/765 |
| 3,999,184 | 12/1976 | Fuss | 343/765 |
| 4,197,548 | 4/1980 | Smith et al. | 343/765 |
| 4,442,435 | 4/1984 | Kiryu et al. | 343/765 |

Primary Examiner—Eli Lieberman
Attorney, Agent, or Firm—Robert J. Kraus

[57] ABSTRACT

An arrangement for a vehicle- or vessel-borne surveillance apparatus is provided with a two-axis, vehicle- or vessel-borne gimbal system (2, 3) and a platform (4) suspended by said gimbal system (2, 3). The platform (4) can be stabilized about the orthogonal axes (AA', BB') of the gimbal system (2,3) with respect to an earth-fixed reference position. The surveillance apparatus (5) is mounted rotatably about an axis (6) perpendicular to the platform (4). The arrangement comprises two linear actuators (7), being mounted directly on the vehicle or vessel, but acting on the platform (4), to permit the above platform stabilization through a mutually equidirectional or opposite motion. The arrangement further comprises a mechanical, universal coupling to transmit the rotational motion produced by a drive mechanism (8), being mounted directly on the vehicle or vessel, to the surveillance apparatus (5).

2 Claims, 4 Drawing Figures

STABILIZED PLATFORM FOR SCANNING ANTENNA

BACKGROUND OF THE INVENTION

The invention relates to an arrangement for a vehicle- or vessel-borne surveillance apparatus, provided with a two-axis, vehicle- or vessel-borne gimbal system and a platform suspended by the gimbal system. The platform can be stabilised about the mutually orthogonal axes of the gimbal system with respect to an earth-fixed reference position, while the surveillance apparatus is mounted rotatably abount an axis perpendicular to the platform.

Such arrangements are known in various embodiments. In these arrangements the drive mechanisms to stabilise the platform about the two axes of the gimbal system are mounted on the vehicle- or vessel-fixed outer gimbal or yoke, and the inner gimbal, respectively, and the drive mechanism for the surveillance apparatus on or under the stabilised platform.

The disadvantage of such arrangements, at least if they have to be mounted at a high position on the vehicle or vessel, is the enormous topweight they form for the vehicle or vessel. The present invention has for its object to considerably reduce this topweight.

SUMMARY OF THE INVENTION

According to the invention, the arrangement as set forth in the opening paragraph comprises in combination two linear actuators, being mounted directly on the vehicle or vessel, but acting on the platform, to permit stabilisation of the platform about the axes of the gimbal system through a mutually equidirectional or opposite motion. A mechanical, universal coupling, for transmitting the rotational motion produced by a drive mechanism to the surveillance apparatus is mounted directly on the vehicle or vessel.

By the measures according to the invention the drive mechanisms for both the platform stabilisation and the surveillance motion are mounted directly on the vehicle or vessel. This results in an enormous saving of weight on the gimbal system and the platform itself. Although it would suffice to mount only the drive mechanisms for the platform stabilisation or only the drive mechanism for the surveillance motion directly on the vehicle or vessel, these two measures achieve a combined saving of weight much greater than the sum of the savings which would be obtained with the measures applied separately, notably as a result of reducing the size and hence the weight of the gimbal system to a high degree.

BRIEF DESCRIPTION OF THE DRAWING

The invention and its advantages will be explained in more detail with reference to the drawing figures, of which.

In the figures like reference numerals represent like parts.

DESCRIPTION OF THE PREFERRED EMBODIMENT

Figure 1:
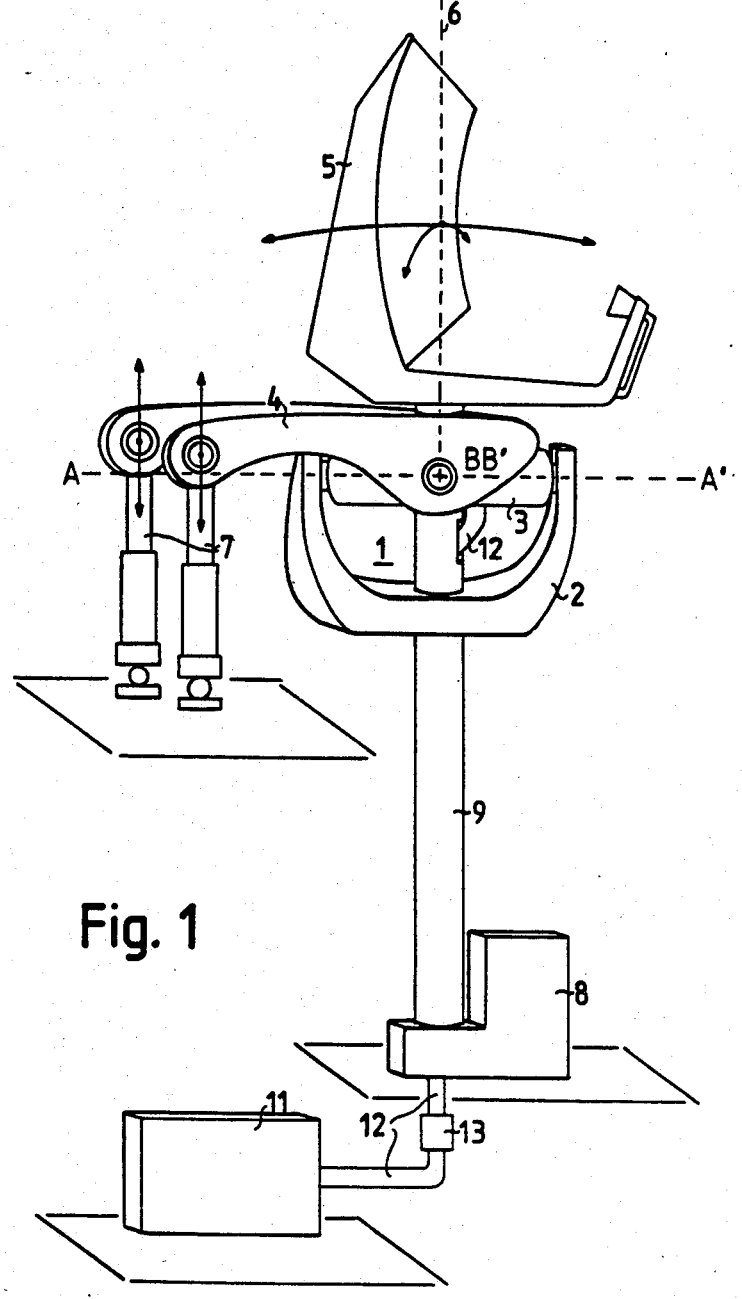
FIG. 1 is a perspective diagram of the arrangement for the surveillance apparatus according to the invention.

In the arrangement of FIG. 1 the gimbal system 1 comprises a yoke 2, fixedly mounted on a vehicle or vessel, and a gimbal 3. Gimbal 3 can be rotated in yoke 2 about the axis AA'. The arrangement is further provided with a platform 4 suspended in the gimbal system 1. Platform 4 is arranged to rotate jointly with gimbal 3 about the axis AA', while the platform is also rotatable about the axis BB' with respect to the gimbal 3. The two axes of the gimbal system 1 are mutually orthogonal. Platform 4 can be stabilised about these two axes with respect to an earth-fixed reference position. The surveillance apparatus, here consisting of a radar antenna 5, is rotatable about an axis 6 perpendicular to platform 4. Instead of a radar antenna, the platform is also suitable to carry optoelectronic surveillance means.

The arrangement further comprises two linear actuators 7 mounted directly on the vehicle or vessel, but acting on the platform 4. Through a mutually equidirectional motion, these actuators cause a rotation of platform 4 about the axis BB'; through a mutually opposite motion, they cause platform 4, jointly with gimbal 3, to rotate about the axis AA'. Platform 4 is servo-controlled by the two linear actuators in a conventional way and is slaved to a gyro-determined reference position, such as to a horizontal plane.

The vehicle or vessel carries drive mechanism 8 for the surveillance apparatus. On the surveillance apparatus the rotational motion produced by drive mechanism 8 is transmitted through rotation shaft 9 and a universal coupling 10 shown in more detail in FIG. 3. If the surveillance apparatus consists of a radar antenna, as depicted in FIG. 1, means are required to transmit the r.f. energy between a transmitting and receiving unit 11, mounted directly on the vehicle or vessel, and the radar antenna 5. The waveguide channel incorporated for this purpose comprises, in addition to a waveguide 12 and a rotary coupler 13, a universal waveguide couple 14, whichis shown in more detail in FIG. 4.

Figure 2:
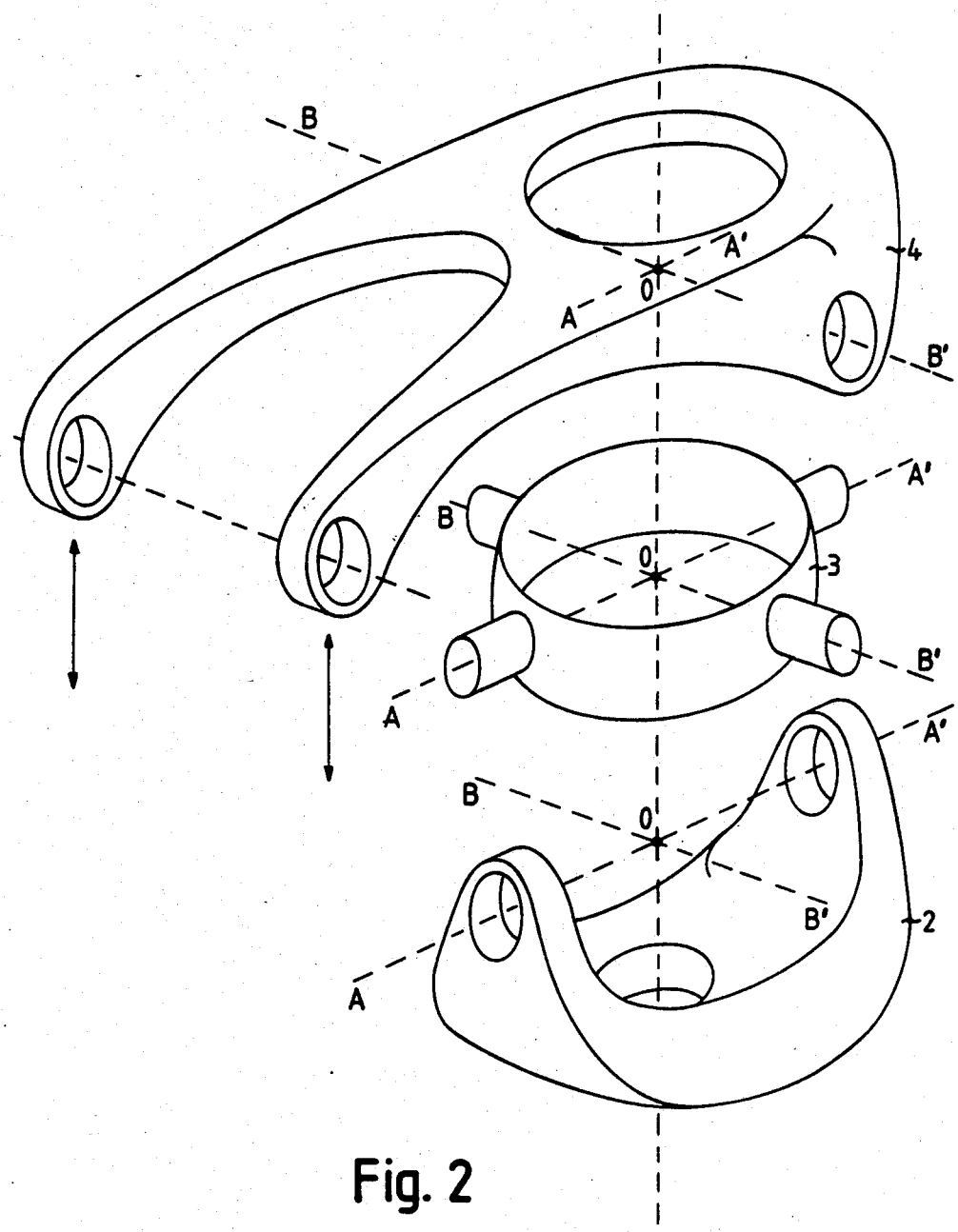
FIG. 2 illustrates the freedom of movement of the platform in the gimbal system.

FIG. 2 shows the freedom of movement of platform 4 about axes AA' and BB' in the gimbal system 1. For the sake of simplicity, yoke 2, gimbal 3 and platform 4 are shown in vertical direction in a displaced position with respect to each other.

Figure 3:
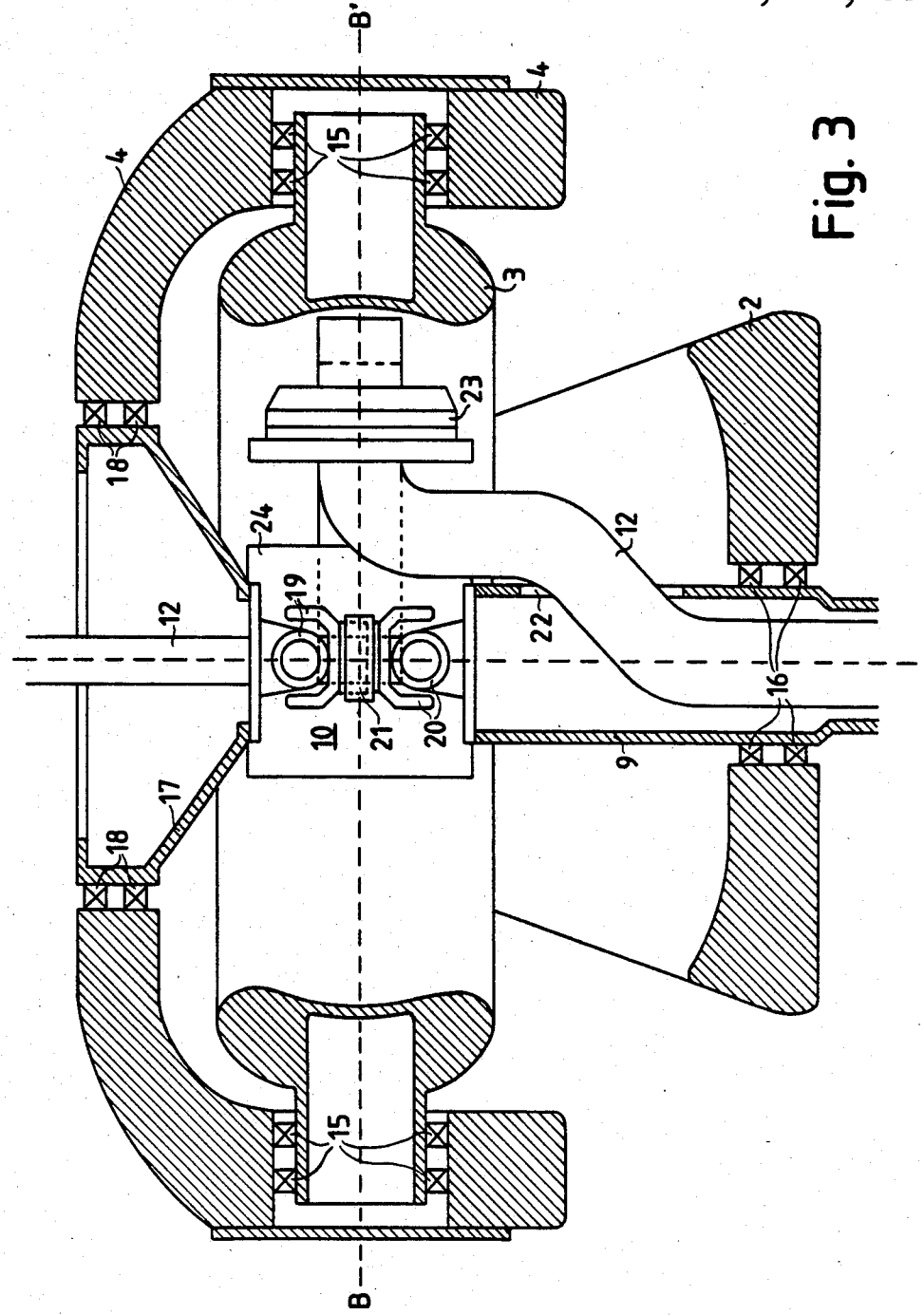
FIG. 3 shows a cross section of the arrangement for the surveillance apparatus.

FIG. 3 is a cross-sectional view of the arrangement in a plane perpendicular to FIG. 1; rotation axis BB' therefore lies in the plane of the figure. FIG. 3 shows again yoke 2, gimbal 3, and platform 4. Bearing 15 permits platform 4 to rotate about axis BB' with respect to gimbal 3. Bearing 16 enables rotation shaft 9 to rotate in a hole at the centre of yoke 2. A bearing 18 permits frame 17 of the surveillance apparatus to rotate in a hole at the centre of platform 4. Frame 17 is connected to shaft 9 through the mechanical, universal coupling 10. This is a homokinetic coupling comprising, in the disclosed embodiment, two universal joints 19 and 20, and a connecting piece 21 variable in the longitudinal direction. The resulting, mutually orthogonal axes of rotation of coupling 10 lie in the plane through axes AA' and BB' and rotate in this plane when the surveillance apparatus performs its rotational motion.

Figure 4:
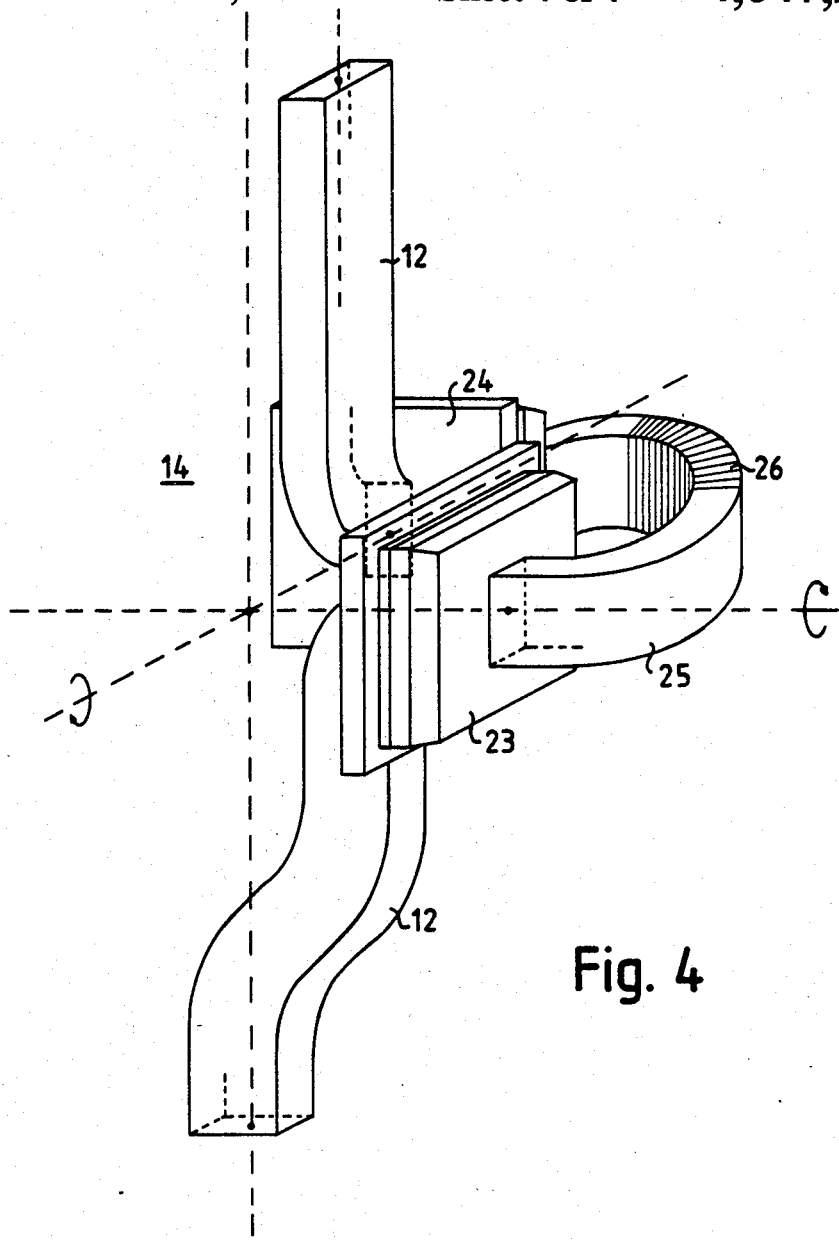
FIG. 4 illustrates the waveguide coupler provided in case the surveillance apparatus consists of a radar antenna.

FIG. 3 also shows waveguide 12, which passes through the rotation shaft 9, leaves this shaft through opening 22, and bypasses mechanical coupling 10 via universal waveguide coupler 14 of FIG. 4 to pass to radar antenna 5 via frame 17. Also the mutually orthogonal axes of rotaion of universal waveguide coupler 14 lie in the plane through axes AA' and BB' and rotate in this plane when the radar antenna performs its rotational motion. The rotational motion of coupler 14 is achieved by rotary couplers 23 and 24. These couplers are nt homokinetic. Should however a uniform waveguide motion be required, a flexible piece of waveguide 26 is incorporated in waveguide part 25 of universal waveguide coupler 14 in the embodiment of FIG. 4. Another solutin could be obtained by inserting another rotary coupler in the waveguide part in the up or down direction.

I claim:

1. An arrangement for stabilizing a mobile-apparatus-mounted surveillance device which is rotatably attached to a platform supported by a gimbal system for movement about first and second mutually-orthogonal axes, characterized in that the arrangement comprises:

(a) first and second linear actuators supported by the mobile apparatus and attached to respective first and second portions of the platform which are on opposite sides of the first axis and on the same side of the second axis, said linear actuators effecting stabilization of the platform about the first axis by moving in opposite directions relative to each other and effecting stabilization of the platform about the second axis by moving together; and (b) a rotary drive mechanism supported by the mobile apparatus for effecting rotation of the surveillance device, said mechanism being attached to said device by a universal coupling adapted for movement about the first and second axes.

2. An arrangement as in claim 1 where the surveillance device comprises a radar antenna, said antenna being electrically coupled by waveguide means to a transmitting and receiving unit supported by the mobile apparatus, said waveguide means includes a universal waveguide coupler adapted for movement about the first and second axes.

* * * * *